United States Patent
Stenson et al.

(10) Patent No.: US 11,225,902 B2
(45) Date of Patent: Jan. 18, 2022

(54) PASSIVE AIR COOLING

(71) Applicant: Kohler Co., Kohler, WI (US)

(72) Inventors: Chad Stenson, Howards Grove, WI (US); William Gysi, Sheboygan, WI (US); Adam Clouse, Howards Grove, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 16/942,562

(22) Filed: Jul. 29, 2020

(65) Prior Publication Data
US 2021/0047960 A1    Feb. 18, 2021

Related U.S. Application Data

(60) Provisional application No. 62/887,275, filed on Aug. 15, 2019.

(51) Int. Cl.
*F02B 29/04* (2006.01)

(52) U.S. Cl.
CPC ................. *F02B 29/0475* (2013.01)

(58) Field of Classification Search
CPC .............. F02B 29/0475; F02B 29/0418; F02B 29/0456; F02M 31/20; F01P 3/18; F01P 2003/187; F01P 2060/02; F01P 1/06
USPC .......................................................... 60/599
See application file for complete search history.

(56) References Cited

U.S. PATENT DOCUMENTS

| | | | |
|---|---|---|---|
| 2,965,083 A | 12/1960 | Percival | |
| 4,236,492 A * | 12/1980 | Tholen | F01P 3/18 123/563 |
| 4,480,439 A * | 11/1984 | Yamane | F02M 31/20 60/599 |
| 4,485,624 A * | 12/1984 | Melchior | F02B 29/0443 60/599 |
| 4,598,687 A * | 7/1986 | Hayashi | F01P 11/18 123/563 |
| 7,328,691 B2 | 2/2008 | Hataura | |
| 8,015,954 B2 | 9/2011 | Kardos | |
| 8,316,805 B2 | 11/2012 | Kardos | |
| 10,240,514 B2 * | 3/2019 | Yang | F02B 29/0443 |
| 10,851,701 B2 * | 12/2020 | Kawamoto | F01P 7/167 |
| 10,927,747 B2 * | 2/2021 | Kaneko | F01P 3/02 |
| 2008/0184704 A1 * | 8/2008 | Bock | F01N 13/1816 60/599 |

(Continued)

FOREIGN PATENT DOCUMENTS

| | | | | |
|---|---|---|---|---|
| CA | 2594476 A1 * | 1/2008 | ....... | F02M 35/10222 |
| CN | 103380285 A * | 10/2013 | ........... | F01K 23/065 |

(Continued)

OTHER PUBLICATIONS

European Search Report in related application No. EP 20191083.3 dated Dec. 7, 2020, (7 pages).

*Primary Examiner* — J. Todd Newton, Esq.

(74) *Attorney, Agent, or Firm* — Lempia Summerfield Katz LLC

(57) ABSTRACT

A passive cooling system includes a fan configured to generate an air flow path for a radiator, the air flow path extending from the fan to the radiator and a cooling pipe extended between a turbocharger and an intake manifold, the cooling path positioned in the air flow path between the fan and the radiator.

20 Claims, 11 Drawing Sheets

(56) References Cited

U.S. PATENT DOCUMENTS

| | | | | |
|---|---|---|---|---|
| 2011/0088637 A1 * | 4/2011 | Hirasawa | .................. | F01P 3/18 |
| | | | | 123/41.31 |
| 2011/0315130 A1 * | 12/2011 | Kardos | ..................... | F01N 3/34 |
| | | | | 123/568.12 |
| 2012/0138025 A1 | 6/2012 | Yoon | | |
| 2012/0181001 A1 * | 7/2012 | Marsh | ................. | F02B 29/0443 |
| | | | | 165/121 |
| 2013/0019847 A1 * | 1/2013 | Nelson | ................... | F02B 47/08 |
| | | | | 123/568.12 |
| 2014/0072839 A1 * | 3/2014 | Park | ..................... | H01M 50/20 |
| | | | | 429/50 |

FOREIGN PATENT DOCUMENTS

| | | | | | |
|---|---|---|---|---|---|
| CN | 204547738 U | * | 8/2015 | ........... | F01K 23/065 |
| CN | 205876478 U | | 1/2017 | | |
| CN | 110630372 A | * | 12/2019 | ............ | F03G 7/065 |
| DE | 953201 C | | 11/1956 | | |
| EP | 0048667 A1 | | 3/1982 | | |
| EP | 1445571 A1 | | 8/2004 | | |
| JP | 2001221106 A | | 8/2001 | | |
| JP | 2002004953 A | | 1/2002 | | |
| JP | 2002070077 A | * | 3/2002 | ............... | E02F 9/18 |
| JP | 2005320980 A | | 11/2005 | | |
| JP | 4293459 B2 | | 4/2009 | | |
| JP | 2010007629 A | * | 1/2010 | | |
| JP | 2018091222 A | | 6/2018 | | |
| WO | 2011102784 A1 | | 8/2011 | | |
| WO | 2015038087 A2 | | 3/2015 | | |
| WO | WO-2016129743 A1 | * | 8/2016 | ............. | F16L 9/127 |
| WO | WO-2018173392 A1 | * | 9/2018 | ............. | F02M 26/22 |

\* cited by examiner

PASSIVE AIR COOLING

This application claims priority benefit of Provisional Application No. 62/887,275 filed Aug. 15, 2019, which is hereby incorporated by reference in its entirety.

FIELD

This disclosure relates in general to a passive charge air cooling system for a turbocharger outlet.

BACKGROUND

An internal combustion engine converts potential chemical energy in the form of a fuel into mechanical energy. In a forced induction internal combustion engine, the volumetric efficiency is improved by forcing air into the combustion chamber. The power input is increased because when more air is forced into the combustion chamber, more fuel is received in the combustion engine, resulting in more combustion reaction.

BRIEF DESCRIPTION OF THE DRAWINGS

Exemplary embodiments are described herein with reference to the following drawings.

DETAILED DESCRIPTION

Figure 1:
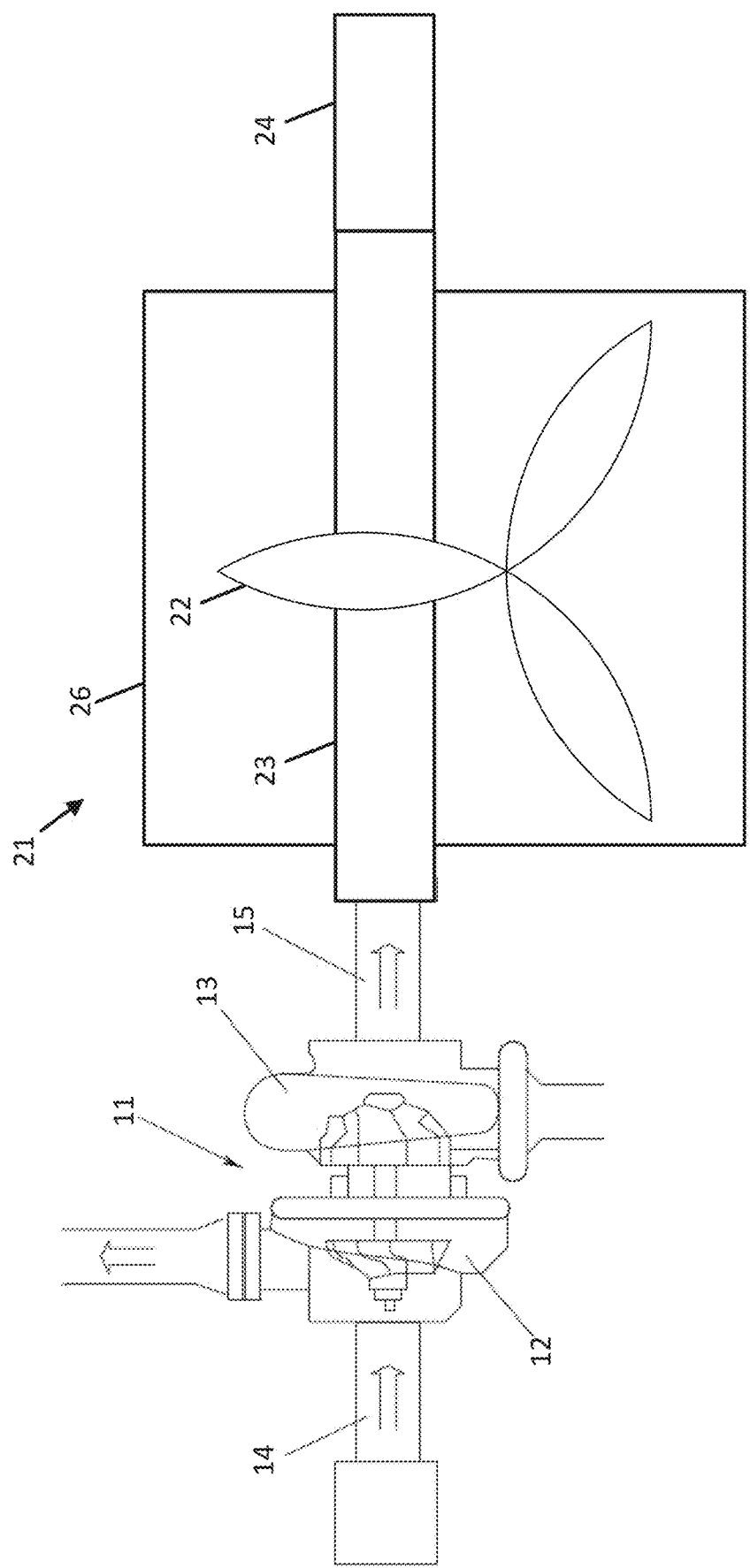
FIG. 1 illustrates a first embodiment of an engine including a passive cooling system.

The following examples describe a cooling system for an internal combustion engine or an engine-generator set including an engine, an alternator, and the cooling system. The examples may include additional systems such as a fuel delivery system, a combustion system, an exhaust system, and other systems. The fuel may be gasoline or diesel. The fuel may be a gaseous fuel such as liquefied petroleum gas (LPG), hydrogen gas, natural gas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture.

The engine may include one cylinder, two cylinders or another number of cylinders. The one or more cylinders may include oscillating one or more pistons. The one or more pistons may be guided through the one or more cylinders by a connecting rod that is connected to a crankshaft by a crankpin. A combustion chamber includes a combustion chamber adjacent to a head of the piston. The combustion chamber is formed in a cylinder head. In one phase of a combustion cycle for the piston, the exhaust port is blocked from the combustion chamber by the piston, and in a subsequent phase, the exhaust port is in gaseous connection with the combustion chamber to release exhaust gas through the exhaust port to a muffler.

The alternator is configured to generate a poly-phase signal through operation of the engine. The alternator may include an exciter armature for generating a field current. As the exciter armature is rotated in a magnetic flux, a time varying voltage is induced in the windings of the exciter armature. The output from the exciter armature is connected to the main field portion of generator. The connection may be made with or without brushes and slip rings. The field current of the output of the exciter provides a magnetic field in rotor field of the generator. As the field portion of the alternator is rotated relative to the stator, a magnetic flux is passed through and across the alternator stator windings producing time varying voltage. The field current from the exciter armature output may be rectified or otherwise controlled. The output of the alternator may be a three phase signal. The poly-phase signal may vary with respect to amplitude and frequency.

The engine or the engine-generator set may include a turbocharger that operates as a fan or pump that spins around an axis or an axle. For example, exhaust gas from the engine flows into an exhaust inlet of a turbine housing through an exhaust conduit, and the movement of the exhaust gas drives a turbine. Under the force of the exhaust gas, the turbine, which is coupled to a shaft, rotates the shaft. The exhaust gas may exit the turbine housing through an exhaust outlet. The exhaust gas is the byproduct of the combustion of the air and fuel mixture.

The turbocharger creates heat because the heat of a gas increases as pressure increases, as well as residual heat from the exhaust. A charge air cooler may include a network of cooling fins or radiating elements that help to remove heat from the air supplied from the turbocharger.

The following examples provide an alternative cooling system to an intercooler or charge air cooler for cooling the air from the turbocharger. In these embodiments, a cooling pipe or tube replaces the intercooler or charge air cooler. The cooling pipe may include fuel in addition to air. For dry fuel low pressure applications, fuel may be present but for a diesel or gasoline application there may not be any fuel in the cooling tube/pipe.

The cooling system described herein requires less space and material than a conventional intercooler or charge air cooler. The cooling pipe or tube containing the high-temperature, pressurized air (and/or fuel) out of the turbocharger is placed into a region of high-airflow. This could be near the main cooling fan or in some other region of the enclosure that has a chamber of high velocity, cool airflow (near or in a fresh air duct, etc.). Other examples may include a supercharger in addition or in the alternative to the turbocharger.

FIG. 1 illustrates a first embodiment of an engine including a turbocharger system 11 and a passive cooling system 21. The turbocharger system 11 may include a compressor 13 located in the duct 15 and a turbine 12 located in the exhaust duct 14 and rotationally coupled to the compressor 13. The turbine 12 may rotate by receiving exhaust gasses from the exhaust duct 14 that directs the exhaust gasses through a series of vanes prior to expansion through the turbine 12. The rotation of the turbine 12 causes the rotation of the compressor 13, whose effect is that of increasing the pressure and the temperature of the air in the duct 15.

The passive cooling system 21 includes a radiator 26, a cooling pipe 23 and a fan 22. Downstream of the compressor 13 and upstream of intake manifold 24 the cooling pipe 23 is positioned relative to the fan 22. To reduce the temperature of the air flowing through the cooling pipe 23, the cooling pipe 23 is placed in the air stream of the fan 22. As shown by arrows A in FIG. 2, the air flow of the fan 22 travels from the fan 22 to the radiator 26. The cooling pipe 23 connects the turbocharger 11 to an intake manifold 24 for the engine. The cooling pipe 23 may be substantially straight (i.e., not curved). The cooling pipe 23 may be substantially parallel to a path extending from the turbocharger 11 to the engine or radiator 26. The terms "substantially straight" or "substantially parallel" may mean straight or parallel, respectively, within a predetermined deviation in angle, for example, measured in degrees, such as 1% to 10% of the measured angle or 0-10 degrees. The cooling pipe 23 may be horizontal or parallel with the surface of the earth. The cooling path may be perpendicular to the input of exhaust into the turbocharger 11, the output of exhaust from the turbocharger 11, and/or the input of air into the compressor 13 of the turbocharger 11, as shown by FIG. 1.

The cooling pipe 23 may be coupled with (connect to directly or indirectly) with the intake manifold 24 and/or the turbocharger 11. The cooling pipe 23 may be made from aluminum, copper, or any another metal that radiates heat well. The cooling pipe 23 may have a cross sectional area that is round, oval, rectangular, square, or another shape. Any effect that would improve the heat transfer (via conduction, convection, or radiation) may be included. This could be achieved via increasing the emissivity of the pipe, increasing the heat conduction in the material of the cooling pipe 23, increasing surface area, or increasing the local convective heat transfer coefficient. For example, the cooling pipe 23 may be painted a specific color such as black. In another example, fins are added to the cooling pipe 23. In other examples, the width and/or length of the cooling pipe 23 is varied.

The turbocharger 11 may operate as a fan or pump that spins around an axis or an axle. For example, exhaust gas from the engine flows into an exhaust inlet of a turbine housing through an exhaust conduit, and the movement of the exhaust gas drives a turbine. Under the force of the exhaust gas, the turbine, which is coupled to a shaft, rotates the shaft. The exhaust gas may exit the turbine housing through an exhaust outlet. The exhaust gas is the byproduct of the combustion of the air and fuel mixture. In an engine, the down stroke of a piston pulls air through low pressure into the cylinder. The amount of air taken into the cylinder compared to the theoretical maximum amount of air that could be taking into the cylinder may be referred as volumetric efficiency. The turbocharger increases the volumetric efficiency of the engine by increasing the density of the air in the air fuel mixture.

The shaft is also coupled to a compressor wheel may be a centrifugal pump that draws in the mixture of air and fuel to an arrangement of blades before expelling the air and fuel mixture through an outlet to the intake manifold of the engine. Alternatively, the centrifugal pump may also mix the air and the fuel such that the centrifugal pump draws in ambient air in through an air inlet and draws in fuel from a fuel inlet. The centrifugal pump may mix and spin the air and fuel through the arrangement of blades before expelling the mixture outward and through the outlet to the intake manifold of the engine.

Rather than the turbocharger 11, a supercharger may be used. The supercharger may include the centrifugal pump but omit the turbine. Rather than the exhaust of the engine driving the turbine of the turbocharger 11, the supercharger may include an electric motor for driving the shaft of the centrifugal pump or being driven directly by the engine's crankshaft.

Figure 2:
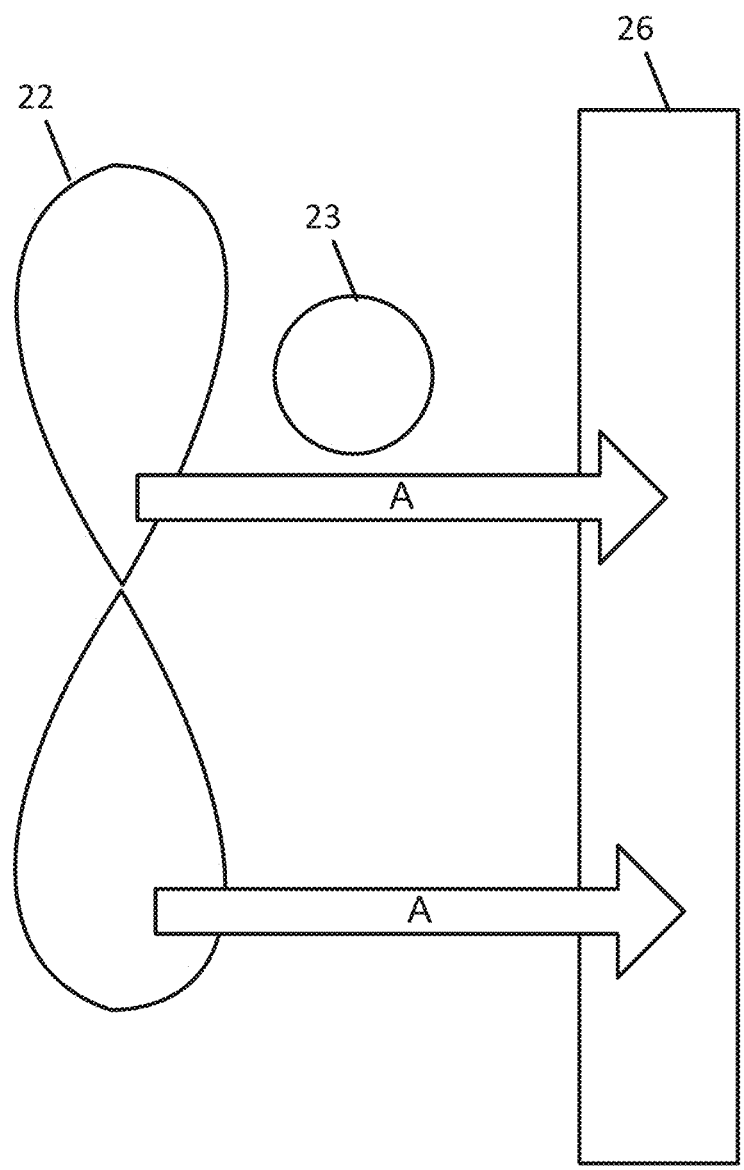
FIG. 2 illustrates a partial side view of the cooling system of FIG. 1.

FIG. 2 illustrates a partial side view of the cooling system of FIG. 1. The side view shows the relative position of the cooling pipe 23 relative to the fan 22 and a radiator 26. The cooling pipe 23 is between the fan 22 and the radiator 26. The cooling pipe 23 may be positioned on a line that extends between the fan 22 and the radiator 26. The cooling pipe 23 may be positioned in an air path of the fan 22. The cooling pipe 23 extends in a direction perpendicular to the air path of the fan 22. Thus, the air in the cooling pipe 23 is perpendicular to the air path of the fan 22. In the example of FIG. 2, the cooling pipe 23 is positioned above the shaft (e.g., rotation axis) of the fan 22 or the center point of the fan 22. Other arrangements are possible. In other examples, the cooling pipe 23 may be near the fan 22 and upstream of the fan 22.

Figure 3:
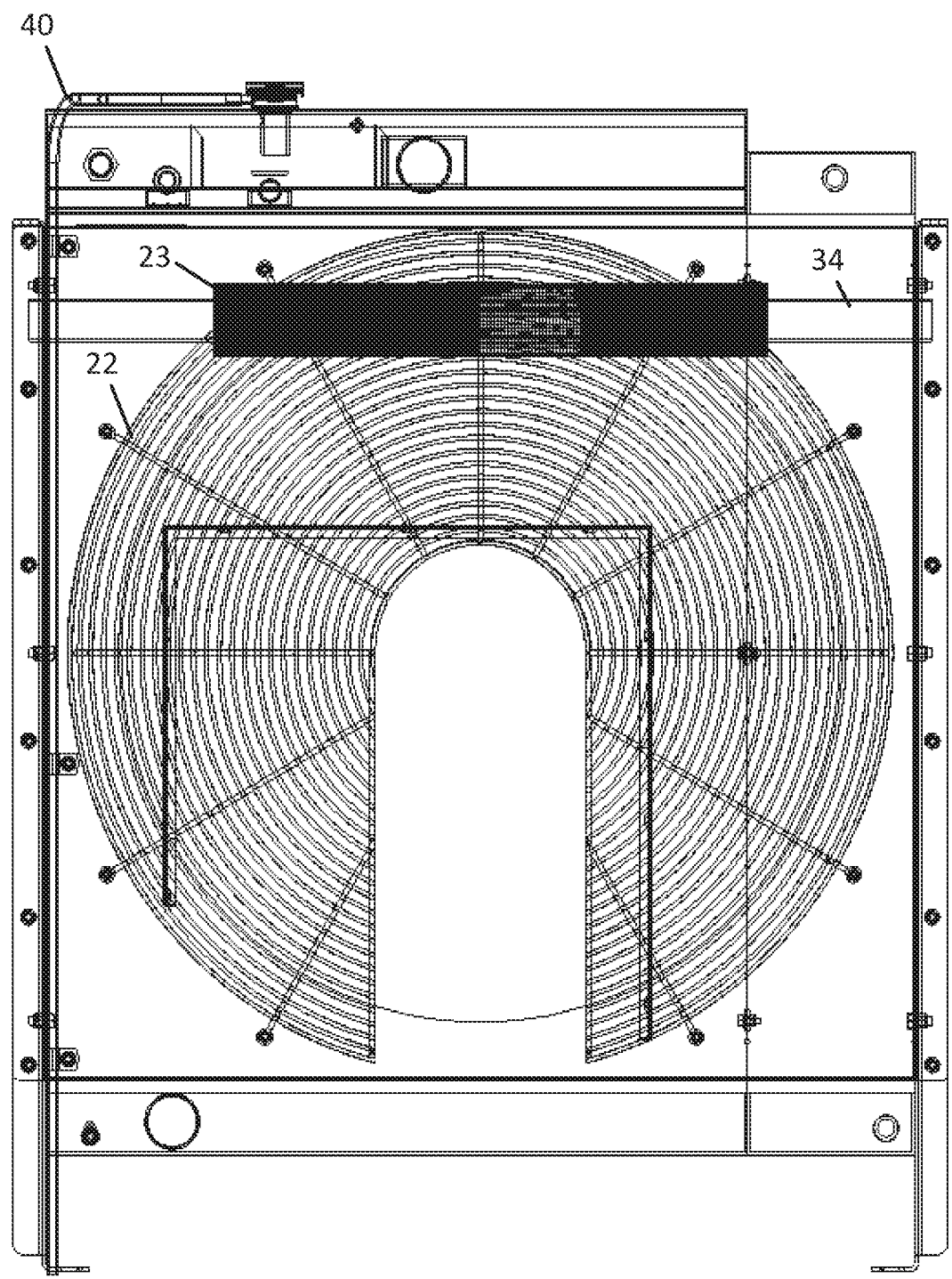
FIG. 3 illustrates another view of the cooling system of FIG. 1.
Figure 4:
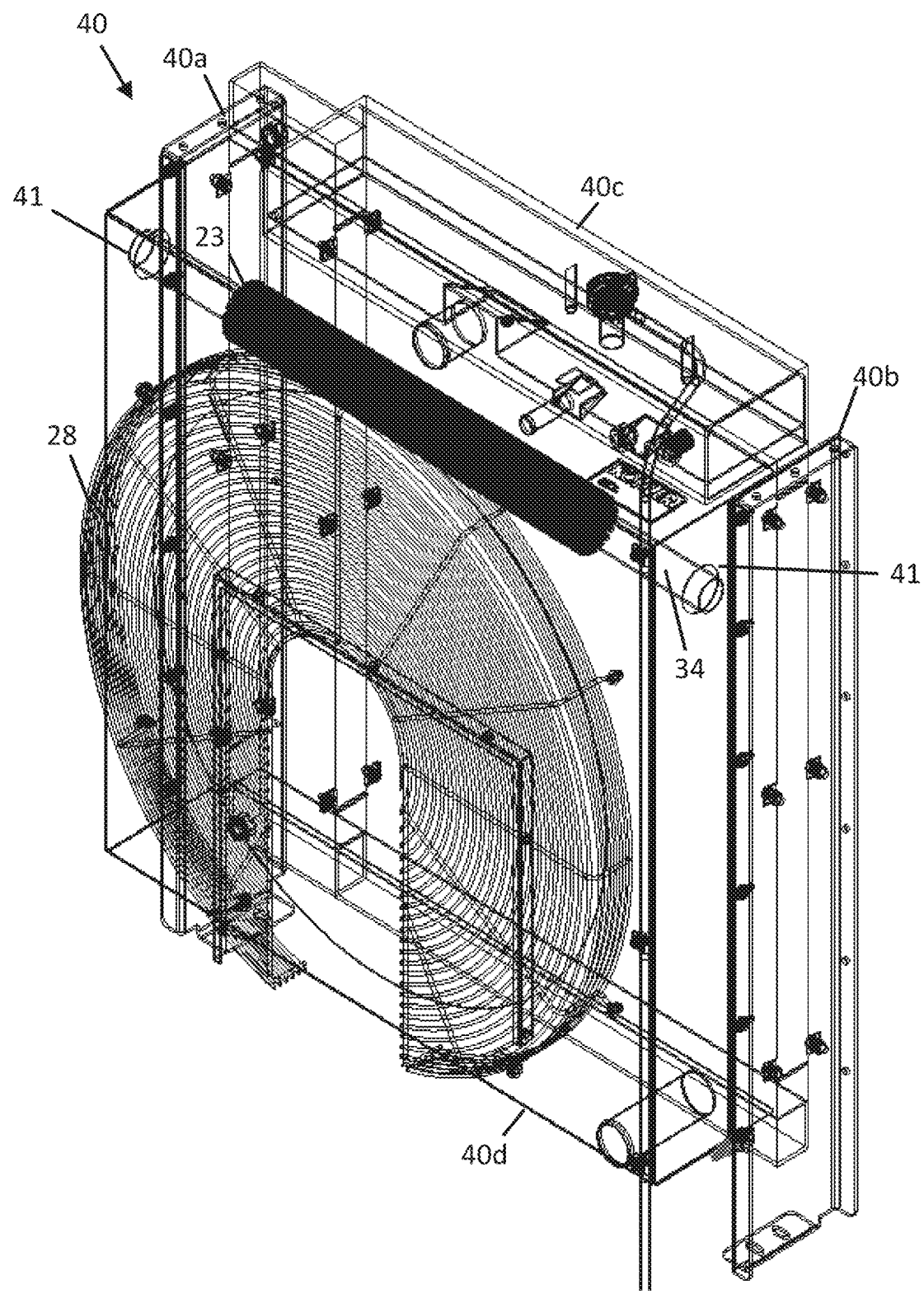
FIG. 4 illustrates a perspective view of the cooling system of FIG. 1.

FIG. 3 illustrates another view of the cooling system of FIG. 1. FIG. 4 illustrates a perspective view of the cooling system of FIG. 1. A frame 40 or housing is configured to support the passive cooling system including the cooling pipe 23. The fan 22 may be supported by the engine (rather than the frame 40). The frame 40 may include a tank for a jacket water radiator including one or more opening for supporting and allowing water pipes or hoses to pass through the frame 40. A supporting element 34 may be coupled to the cooling pipe 23. The frame 40 may include one or more support holes for the supporting element 34. In one example, the supporting element 34 is a pipe coupled to the cooling pipe 23 and air flows through the supporting element 34. In another example, the supporting element 34 includes a bracket or other fixture for connecting the cooling pipe 23 to the frame 40.

The frame 40 may include multiple rails that are fastened together, for example, using bolts or screws. Each joint between two rails may include multiple fasteners. The example of FIG. 4 illustrates a first vertical rail 40a and a second vertical rail 40b coupled to a first horizontal rail 40c and a second horizontal rail 40d. In the example, of FIGS. 3 and 4, one or more rails may have a through hold for the cooling pipe 23 or the supporting element 34. For example, the vertical rails 40a and 40b may include opening 41 for insertion and support of the cooling piper 23 or the supporting element 34.

The fan 22 may include a fan guard 28 that protects the fan 22, prevents debris from entering the fan 22, and/or protects a user or other person or animals from contact with the fan 22.

Figure 5:
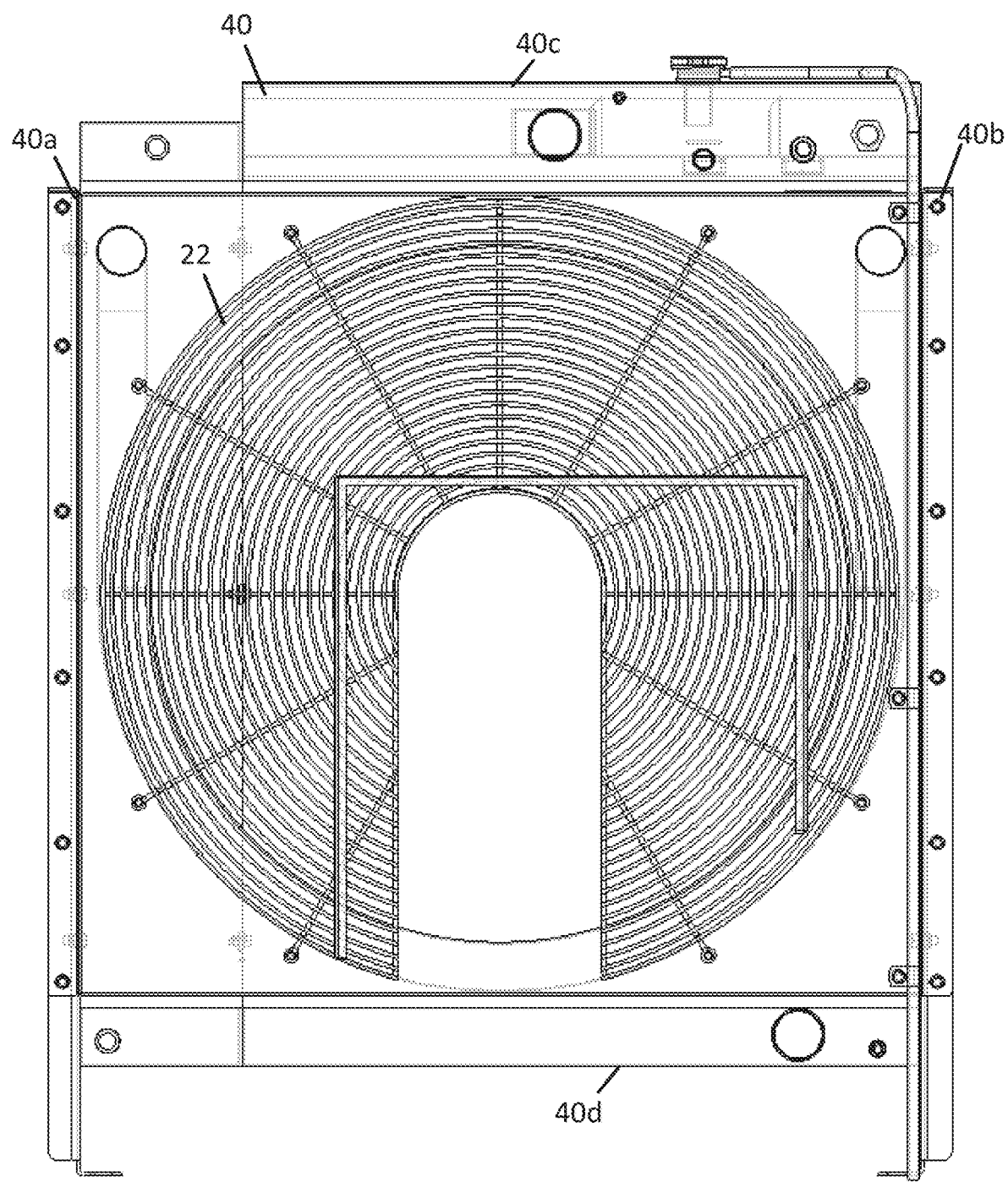
FIG. 5 illustrates a second embodiment of a passive cooling system.
Figure 6:
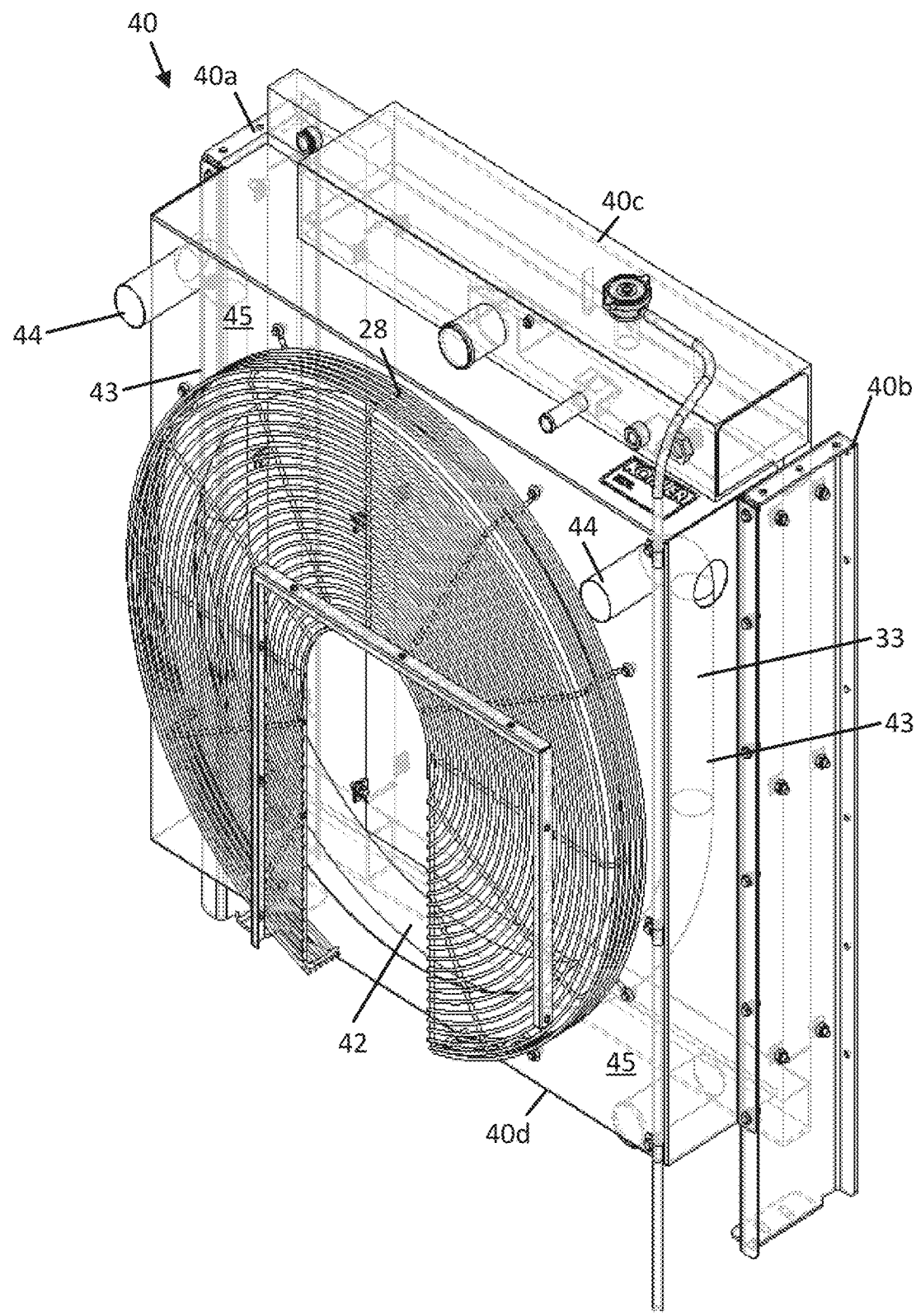
FIG. 6 illustrates a perspective view for the cooling system of FIG. 5.

FIG. 5 illustrates a second embodiment of a passive cooling system. FIG. 6 illustrates a perspective view for the cooling system of FIG. 5. In the second embodiment, the cooling pipe 33 is substantially curved having a first portion that is aligned in a first direction and a second portion aligned in a second direction. The shape of the cooling pipe 33 causes the air from the turbocharger 11 to travel a longer path to the intake manifold 24. The longer path means that the air in the cooling pipe 33 spends more time in the air path of the radiator 26, further cooling the air in the cooling pipe 33.

The shape of the cooling pipe 33 may be defined according to a predetermined radius of curvature along a curved portion 42. The curved portion 42 may be coupled to one or more straight portions 43 that extend along the length or height of the frame 40. In addition, one or more support portions 44 may mount the cooling pipe 33 to the frame 40. The support portions may be mounted on a plate 45 of the frame that faces the fan 22 or fan guard 28. The plate 45 may also support the fan 22 or fan guard 28 through one or more openings. The support portions 44 extend through the openings of the plate 45.

The predetermined radius of curvature for the curved portion 42 of the cooling pipe 33 may be equal to that of the fan 22 or fan guard 28. The predetermined radius of curvature for the cooling pipe 33 may be within 5% or 10% to that of the fan 22 or fan guard 28.

FIGS. 5 and 6 illustrate an example where the curved portion is down (aligned with horizontal rail 40d). As compared to that shown in FIGS. 5 and 6, the cooling pipe 33 may be positioned at any angle. For example, the curved portion may be aligned with horizontal rail 40c, vertical rail 40a, or vertical rail 40b.

The cooling pipe 33 may be made from aluminum, copper, or another material. The cooling pipe 33 may have a cross sectional area that is round, oval, rectangular, square, or another shape. A conductive element that improves the heat transfer of the cooling pipe 33 via conduction, convection, or radiation may be included. This could be achieved via increasing the emissivity of the pipe, increasing the heat conduction in the material of the cooling pipe 23, increasing surface area, or increasing the local convective heat transfer coefficient. For example, the cooling pipe 23 may be painted a specific color such as black. In another example, fins are added to the cooling pipe 23. In other examples, the width and/or length of the cooling pipe 23 is varied.

Figure 7:
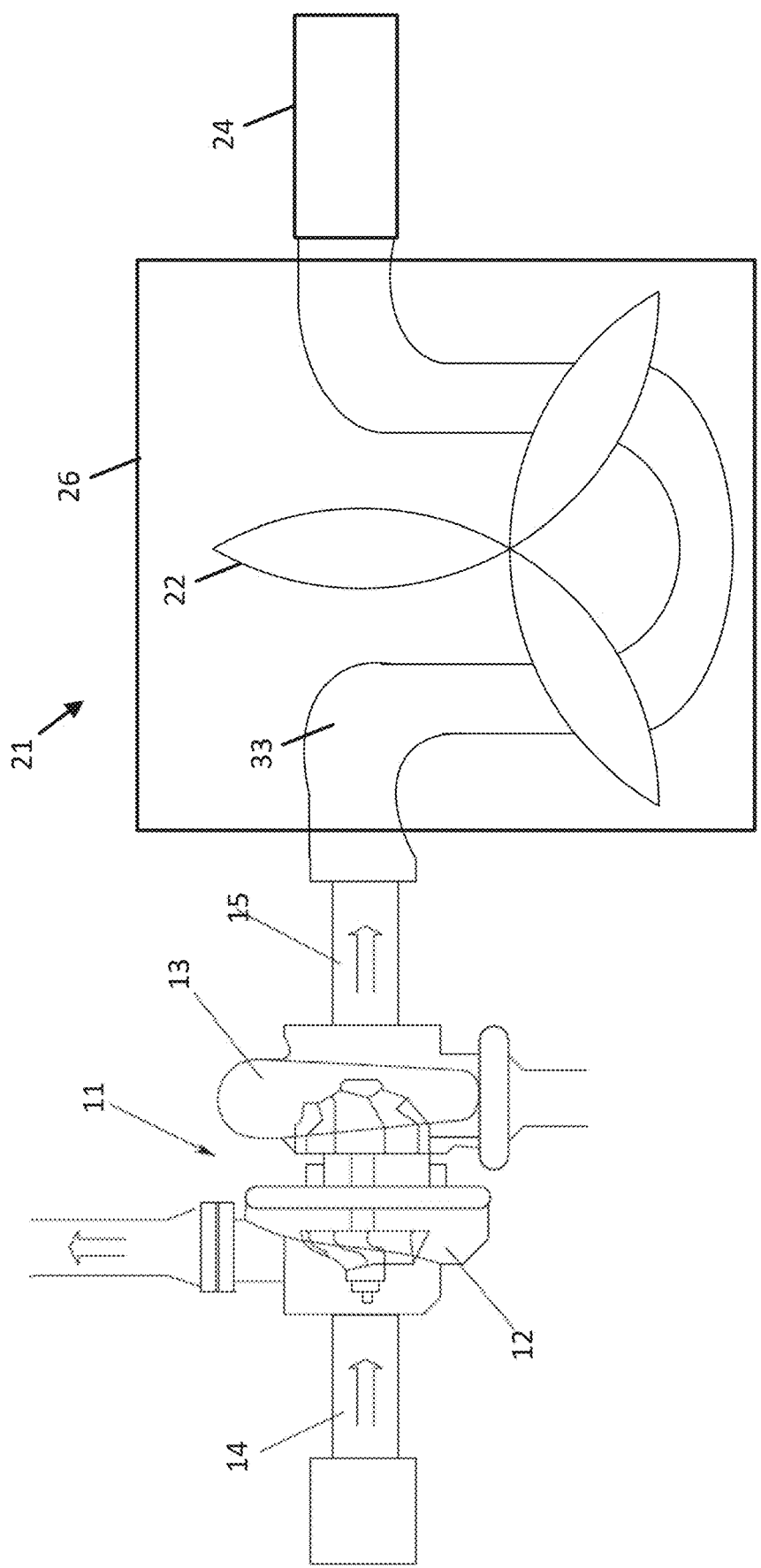
FIG. 7 illustrates an engine including the passive cooling system of FIGS. 5 and 6.
Figure 8:
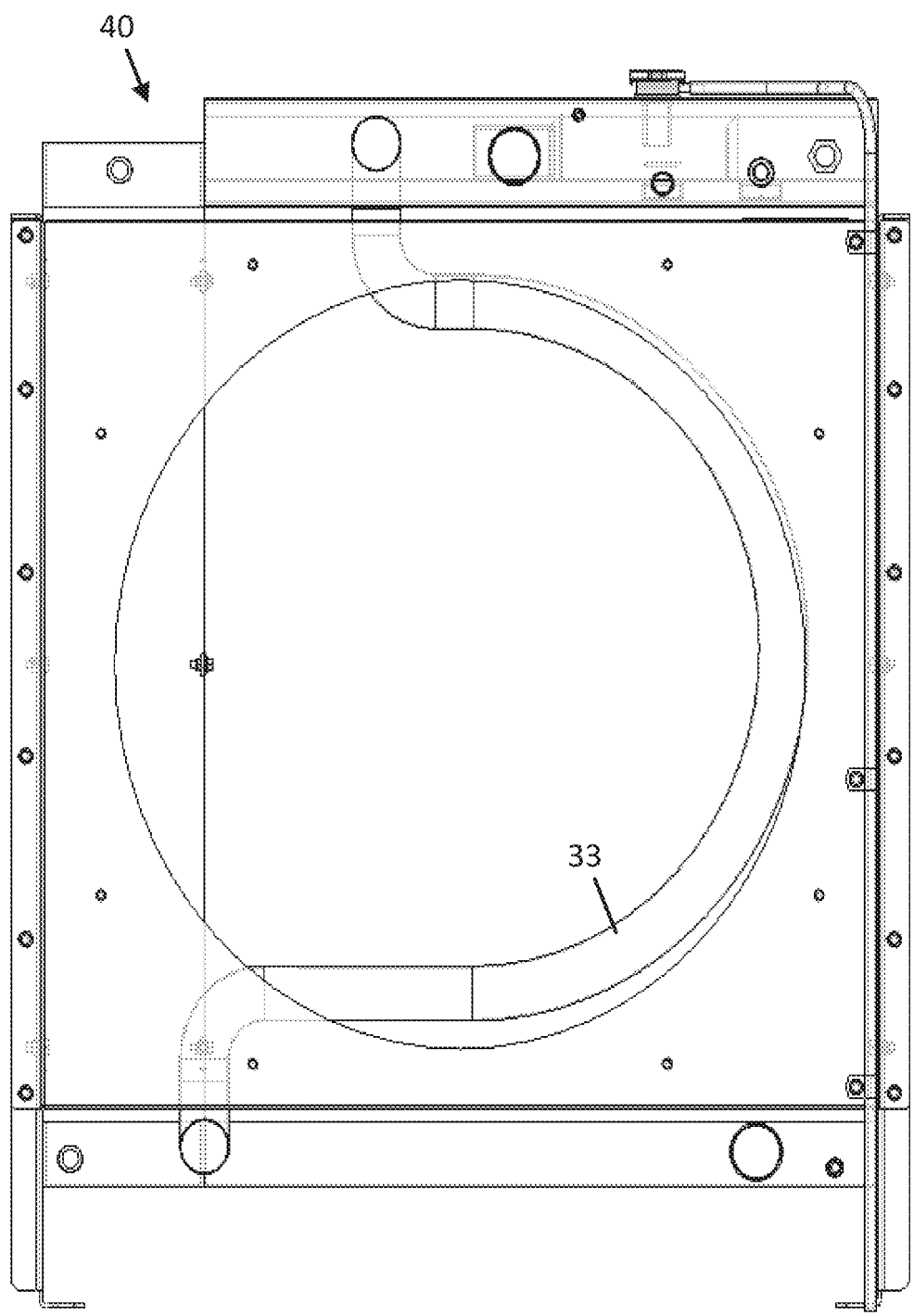
FIG. 8 illustrates another view of the cooling system of FIGS. 5-7.
Figure 9:
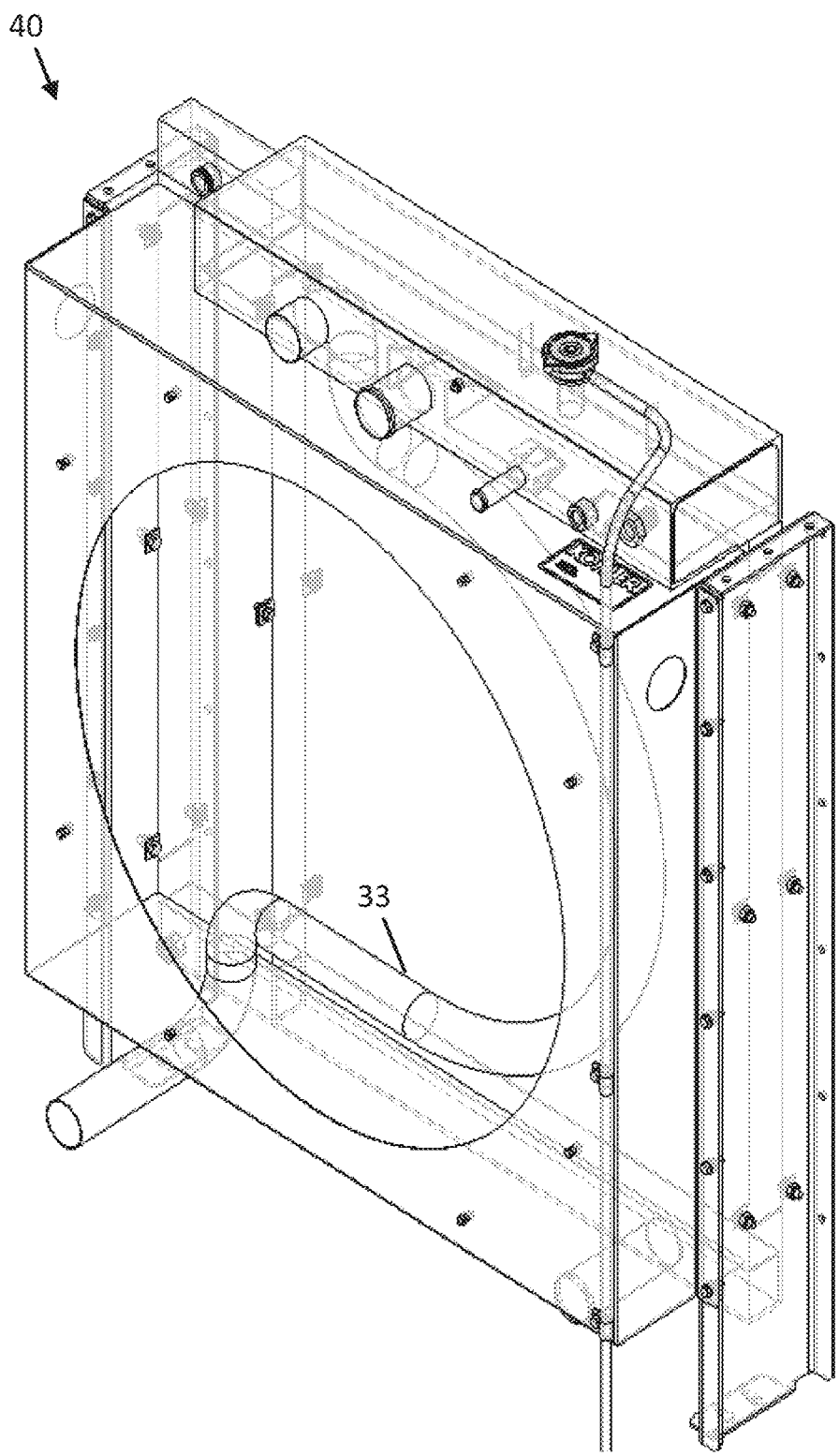
FIG. 9 illustrates a perspective view of the cooling system of FIGS. 5-7.

FIG. 7 illustrates the second embodiment of an engine including a passive cooling system 21 including a cooling pipe 33, a fan 22 and a radiator 26. FIG. 8 illustrates another view of the cooling system of FIG. 7. FIG. 9 illustrates a perspective view of the cooling system of FIG. 7. The shape of the cooling pipe 33 may follow a perimeter of the fan 22. The shape of the cooling pipe 33 may be selected in order to maximize the air flow over the cooling pipe 33 while still minimizing the interruption of the cooling pipe 33 with the air flow to the radiator 26.

Rather than the U-shape illustrated in FIGS. 7-9, the cooling pipe 33 may be other shapes such as S-shaped, L-shaped, straight or otherwise. The length of the cooling pipe 33 may be proportional to the amount of the cooling affect achieved. Thus, for a fan having a predetermined diameter, a cooling pipe 33 that is S-shaped may have a greater length than a cooling pipe 33 that is U-shaped, which may have a greater length than a cooling pipe that is straight. Other shapes and patterns are possible.

Figure 10:
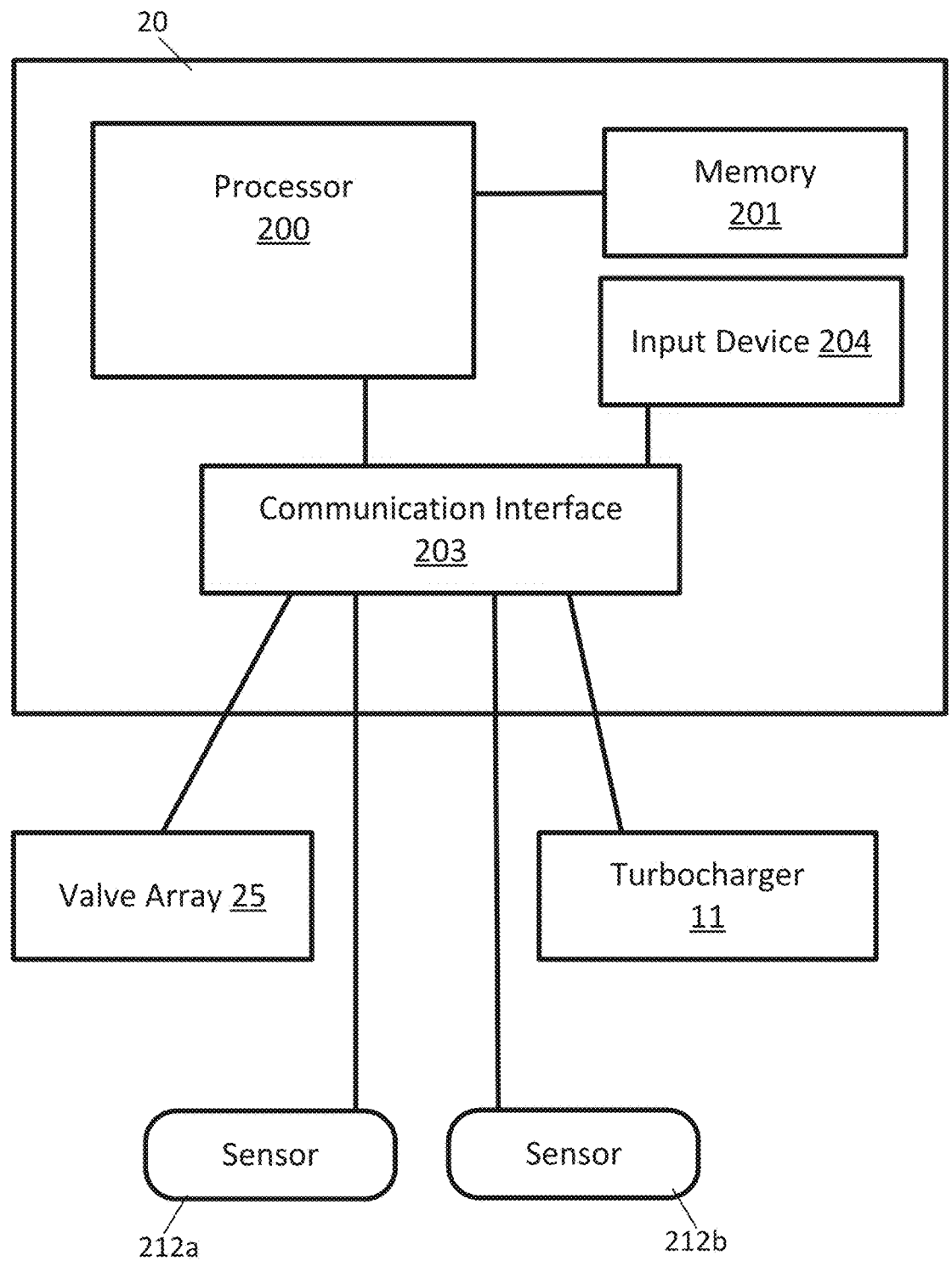
FIG. 10 illustrates an example controller for a passive cooling system.

FIG. 10 illustrates a controller 20 including a processor 200, a memory 201, an input device 204, and a communication interface 203. The communication interface 203 may communicate with one or more sensors such as a first sensor 212a and a second sensor 212b, a valve array 25 and the turbocharger 11. Additional, different, or fewer components may be included.

The first sensor 212a may be an air to fuel ratio sensor. The first sensor 212a may detect whether the turbocharger 11 is on or off. The first sensor 212a may be an ignition sensor that detects whether the engine is on or off.

The second sensor 212b may be a temperature sensor placed inside the cooling pipe, outside the cooling pipe, in a vicinity of the radiator, or in another internal location of the engine or generator. The second sensor 212b may be a combination temperature and manifold absolute pressure (TMAP) sensor.

The valve array 25 may include one or more valves that open and close the cooling pipe. In some examples, the cooling pipe includes multiple paths. The pipes may extend from a first manifold on one side of the cooling pipe(s) and one side of the fan to a second manifold on another side of the cooling pipe(s) and the other side of the fan. For example, a straight path may be a short path across the diameter of the fan, and a curved path (S-shaped or U-shaped) may be a long path across the diameter of the fan. The long path is associated with a first valve of the valve array 25 and the short path is associated with a second valve of the valve array 25. Opening the first path and closing the second path provides a first cooling path. Closing the first path and opening the second path provides a second cooling path. Opening the first path and opening the second path provides a combination of the first and second cooling paths.

The input device 204 may receive communications from a network or input from a user regarding setting for the processor 200. The settings may include a configuration of the valve array 25, sensor thresholds (temperature thresholds) for operating the valve array 25 and bypass system at a target temperature.

Figure 11:
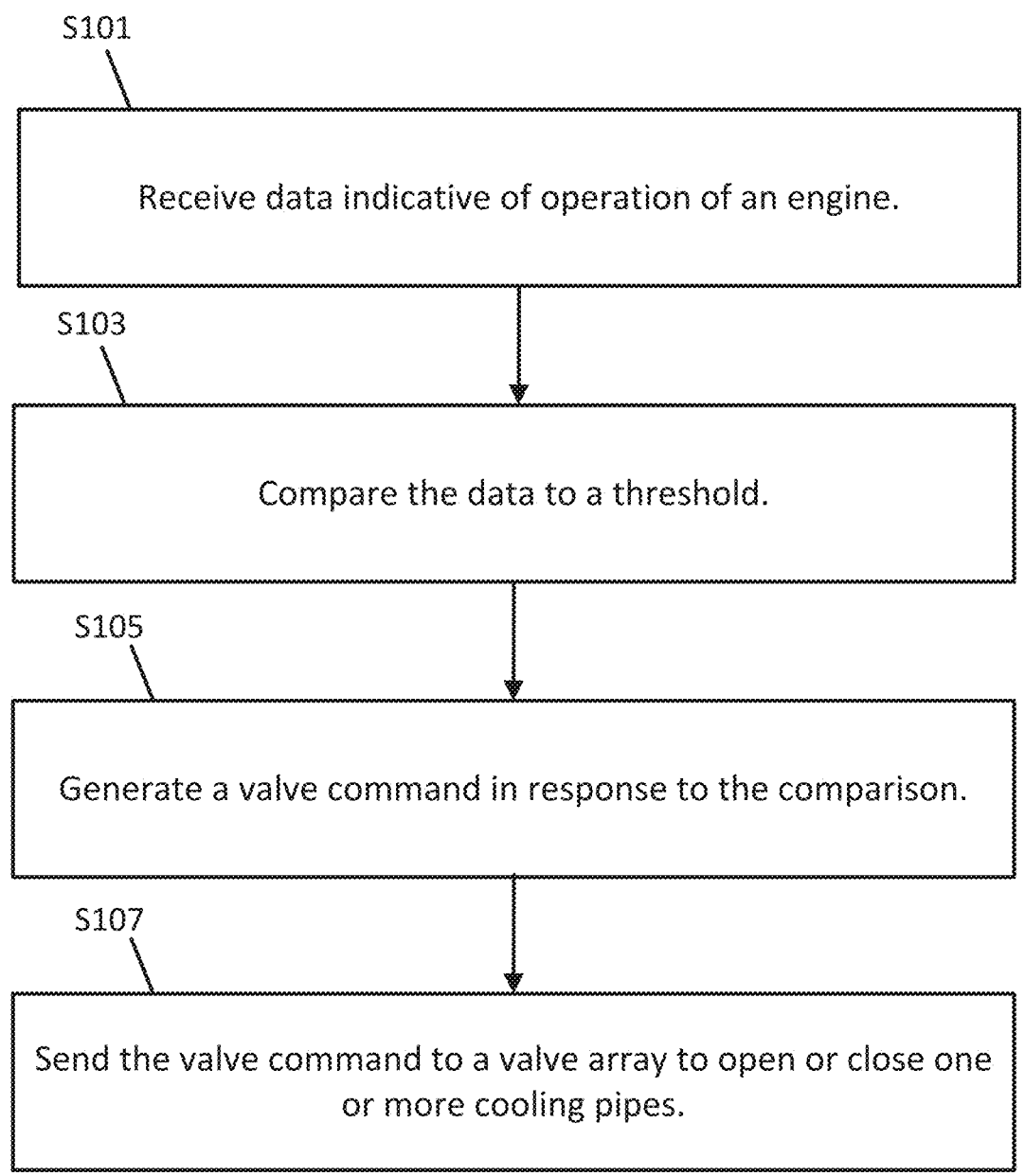
FIG. 11 illustrates an example flowchart for the controller of FIG. 10.

FIG. 11 illustrates an example flowchart for operation of the controller 20 of FIG. 10 to implement a dynamic cooling system such as an on demand charge air cooling having selectable cooling paths. The acts of FIG. 11 may be repeated in multiple iterations. Additional, different, or fewer acts may be included.

At act 5101, the controller 20 or the communication interface 203 is configured to receive data indicative of an operation of an engine (or generator) such as turbocharger data for the operation of the turbocharger 11. The data indicative of operation of the engine or turbocharger 11 may include sensor data, user inputs, or other instructions. The sensor data may describe an ambient or internal state of the engine such as temperature. The sensor data may be a temperature of the air in the cooling pipe or at the exit of the turbocharger 11.

At act 5103, the controller 20 or the processor 200 compares the data indicative of the operation of the engine to a threshold. The threshold may be a temperature setting for the air in the cooling pipe or at the exit of the turbocharger 11. The threshold may include multiple temperature levels that are associated with multiple valve settings for the valve array 25.

At act 5105, the controller 20 or the processor 200 generates a valve command in response to the comparison. As the temperature increases a longer path may be selected for the cooling pipe using the valve array 25.

At act 5107, the controller 20 or the communication interface 203 sends the valve command to the valve array 25 to open or close one or more cooling pipes according to embodiments described herein.

The phrases "coupled with" or "coupled to" include directly connected to or indirectly connected through one or more intermediate components. Additional, different, or fewer components may be provided. Additional, different, or fewer components may be included.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a key pad, a touchscreen, a key, an ignition, or other structure configured to allow a user to enter data or provide a command to operate the engine. The input device 204 may include a connection to a network, a smartphone, a tablet, a personal computer configured to electronically transmit the command to the engine. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A passive cooling system comprising:
a fan configured to generate an air flow path for a radiator, the air flow path extending from the fan to the radiator; and
a cooling pipe having a shape to follow, at least in part, a perimeter of the fan and extended between a turbocharger and an intake manifold, the cooling pipe positioned in the air flow path between the fan and the radiator.

2. The passive cooling system of claim 1, wherein the cooling pipe is aluminum.

3. The passive cooling system of claim 1, wherein the cooling pipe extends in a direction perpendicular to the air flow path.

4. The passive cooling system of claim 1, wherein the cooling pipe is parallel to a line from the turbocharger to the intake manifold.

5. The passive cooling system of claim 1, wherein the cooling pipe extends in a curved shape.

6. The passive cooling system of claim 1, wherein the cooling pipe extends in a first direction from the turbocharger toward the passive cooling system, and a second direction perpendicular to the first direction.

7. The passive cooling system of claim 1, wherein the cooling pipe is U-shaped.

8. The passive cooling system of claim 1, further comprising:
a turbine located in an exhaust duct; and
a compressor rotationally coupled to the turbine and configured to force air through the cooling pipe.

9. The passive cooling system of claim 1, further comprising:
a frame including one or more openings to support the cooling pipe.

10. The passive cooling system of claim 9, wherein a vertical plate of the frame supports the cooling pipe and the fan.

11. An engine comprising:
a turbocharger;
an intake manifold; and
a passive cooling system including:
a fan configured to generate an air flow path for a radiator; and
a cooling pipe having a shape to follow, at least in part, a perimeter of the fan and extended between a turbocharger and an intake manifold, the cooling pipe positioned in the air flow path between the fan and the radiator.

12. The engine of claim 11, wherein the cooling pipe extends in a direction perpendicular to the air flow path.

13. The engine of claim 11, wherein the cooling pipe is substantially parallel to a path from the turbocharger to the intake manifold.

14. The engine of claim 11, wherein the cooling pipe extends in a curved shape.

15. The engine of claim 11, wherein the cooling pipe extends in a first direction from the turbocharger toward the passive cooling system, and a second direction perpendicular to the first direction.

16. The passive cooling system of claim 1, further comprising:
a frame including one or more openings to support the cooling pipe, wherein one or more openings in the frame supports the cooling pipe and the fan.

17. A method for operating a dynamic cooling system, the method comprising:
receiving data indicative of an operation of an engine or generator;
comparing the data indicative of the operation of the engine or generator to a threshold;
generating a valve command in response to the comparison; and
providing the valve command to a valve system including a plurality of valves to open or close a plurality of cooling pipes associated with a plurality of cooling paths having different shapes.

18. The method of claim 17, wherein the plurality of cooling pipes includes a first cooling pipe having a first path length across a diameter of a fan and a second cooling pipe having a second path length across the diameter of the fan.

19. The method of claim 18, wherein the first cooling pipe and the second cooling pipe are positioned between the fan and a radiator.

20. The method of claim 17, wherein at least one of the plurality of cooling pipes has a shape that follows a perimeter of a fan.

* * * * *